(12) United States Patent
Stojkovic et al.

(10) Patent No.: US 11,345,283 B2
(45) Date of Patent: May 31, 2022

(54) SUPPORT ASSEMBLY FOR BOX SIDE STEP

(71) Applicant: Ford Global Technologies, LLC, Dearborn, MI (US)

(72) Inventors: Dragan B. Stojkovic, Taylor, MI (US); Joshua Jacob Clement, Dearborn, MI (US); Shawn Michael Morgans, Chelsea, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 267 days.

(21) Appl. No.: 16/803,108

(22) Filed: Feb. 27, 2020

(65) Prior Publication Data

US 2021/0268965 A1 Sep. 2, 2021

(51) Int. Cl.
*B60R 3/00* (2006.01)
*B60R 9/02* (2006.01)
*B62D 33/02* (2006.01)

(52) U.S. Cl.
CPC .................. *B60R 3/00* (2013.01); *B60R 9/02* (2013.01); *B62D 33/02* (2013.01)

(58) Field of Classification Search
CPC .............. B60R 3/00; B60R 9/02; B62D 33/02
See application file for complete search history.

(56) References Cited

U.S. PATENT DOCUMENTS

| | | | |
|---|---|---|---|
| 3,171,671 A * | 3/1965 | Cornett | B60R 3/00 280/163 |
| 7,086,689 B2 | 8/2006 | Dean | |
| 7,118,150 B2 * | 10/2006 | Bruford | B60R 3/02 296/37.1 |
| 7,823,896 B2 * | 11/2010 | VanBelle | B60R 3/02 280/166 |
| 9,126,535 B1 | 9/2015 | Moore | |
| 10,150,418 B2 * | 12/2018 | Martin | B60R 3/00 |

* cited by examiner

*Primary Examiner* — Bryan A Evans
(74) *Attorney, Agent, or Firm* — Vichit Chea; Carlson, Gaskey & Olds, P.C.

(57) ABSTRACT

This disclosure relates to a support assembly for a box side step of a motor vehicle, such as a pickup truck. An example vehicle includes a cargo box including a side wall, a box side step, and a support assembly for the box side step including a base that does not project beyond an outer panel of the side wall.

19 Claims, 7 Drawing Sheets

SUPPORT ASSEMBLY FOR BOX SIDE STEP

TECHNICAL FIELD

This disclosure relates to a support assembly for a box side step of a motor vehicle, such as a pickup truck.

BACKGROUND

Pickup trucks typically include a latching tailgate that swings between an upright, closed position and a horizontal, open position. When in the closed position, the tailgate is latched to a cargo box. When open, the tailgate provides access to the cargo box from the rear of the pickup truck. Some pickup trucks incorporate a side step adjacent a side of the cargo box which can be used by a user to access the cargo box from the side of the pickup truck.

SUMMARY

A motor vehicle according to an exemplary aspect of the present disclosure includes, among other things, a cargo box including a side wall, a box side step, and a support assembly for the box side step including a base that does not project beyond an outer panel of the side wall.

In a further non-limiting embodiment of the foregoing motor vehicle, the base lies substantially in a plane parallel to a ground surface.

In a further non-limiting embodiment of any of the foregoing motor vehicles, the box side step includes a foot well, and a bottom wall of the foot well directly contacts the base.

In a further non-limiting embodiment of any of the foregoing motor vehicles, a portion of the bottom wall of the foot well projects outward beyond the outer panel.

In a further non-limiting embodiment of any of the foregoing motor vehicles, the portion of the bottom wall projects about 80 mm outward beyond the outer panel.

In a further non-limiting embodiment of any of the foregoing motor vehicles, the vehicle includes a storage compartment accessible via a moveable door of the foot well.

In a further non-limiting embodiment of any of the foregoing motor vehicles, the foot well is fastened to the base via a plurality of fasteners.

In a further non-limiting embodiment of any of the foregoing motor vehicles, the support assembly includes at least one vertical support connecting the base to an inner panel of the side wall.

In a further non-limiting embodiment of any of the foregoing motor vehicles, the at least one vertical support includes a first vertical support and a second vertical support, the first vertical support is connected to the base adjacent a front end of the base, and the second vertical support is connected to the base adjacent a rear end of the base.

In a further non-limiting embodiment of any of the foregoing motor vehicles, the vertical supports are different lengths.

In a further non-limiting embodiment of any of the foregoing motor vehicles, a front-most one of the first and second vertical supports is shorter than the other of the first and second vertical supports.

In a further non-limiting embodiment of any of the foregoing motor vehicles, the first vertical support is connected to the base adjacent an inner edge of the base, the support assembly includes a first reinforcement bracket connected between the first vertical support and a point on the base adjacent an outer edge of the base, the second vertical support is connected to the base adjacent an inner edge of the base, and the support assembly includes a second reinforcement bracket connected between the second vertical support and a point on the base adjacent an outer edge of the base.

In a further non-limiting embodiment of any of the foregoing motor vehicles, the support assembly includes a third reinforcement bracket connected between the base and a bottom of a bed of the cargo box.

In a further non-limiting embodiment of any of the foregoing motor vehicles, the support assembly includes a rear bracket connecting the base to a wheel well housing, and the support assembly includes a front bracket connecting the base to an extension projecting laterally from the cargo box.

In a further non-limiting embodiment of any of the foregoing motor vehicles, the box side step is forward of a rear wheel well of the motor vehicle.

In a further non-limiting embodiment of any of the foregoing motor vehicles, the box side step is aligned with a portion of a running board of the motor vehicle.

In a further non-limiting embodiment of any of the foregoing motor vehicles, the side wall is one of a first side wall and a second side wall of the cargo box, the box step is a first box step corresponding to the first side wall, and the motor vehicle includes a second box step corresponding to the second side wall.

In a further non-limiting embodiment of any of the foregoing motor vehicles, the motor vehicle is a pickup truck.

A box side step assembly for a motor vehicle according to an exemplary aspect of the present disclosure includes, a foot well and a support assembly including a base. The base supports the foot well on an upper surface thereof, the upper surface lying substantially in a plane parallel to a ground surface. Further, the base is supported at a location forward of a rear wheel housing by a structure connected to one of an inner panel of a cargo box, a rear wheel well housing, and an extension projecting laterally from the cargo box.

In a further non-limiting embodiment of the foregoing box side step assembly, the structure is a rear bracket connecting the base to the rear wheel well housing, and the support assembly includes a front bracket connecting the base to the extension.

BRIEF DESCRIPTION OF THE DRAWINGS

In FIG. 1, the vehicle is a pickup truck.

In FIG. 2, an outer panel of the cargo box is removed to illustrate an example support assembly for the box side step.

DETAILED DESCRIPTION

This disclosure relates to a support assembly for a box side step of a motor vehicle, such as a pickup truck. An example vehicle includes a cargo box including a side wall, a box side step, and a support assembly for the box side step including a base that does not project beyond an outer panel of the side wall. The support assembly is relatively compact, easily assembled, and effectively transfers loads to the cargo box. These and other benefits will be appreciated from the following description.

Figure 1:
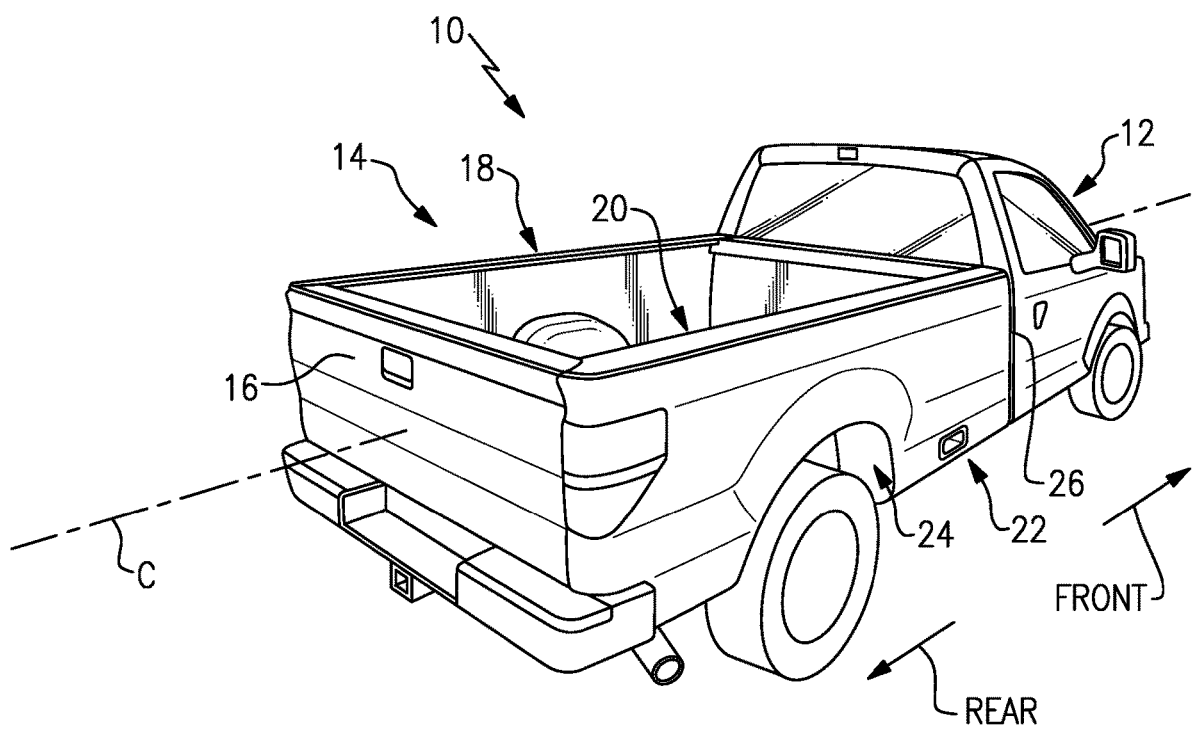
FIG. 1 is a rear-perspective view of a motor vehicle including a box side step.

FIG. 1 illustrates a motor vehicle 10 ("vehicle 10"), which in this example is a pickup truck. The vehicle 10 includes a passenger cabin 12 and a cargo box 14 rearward of the passenger cabin 12. The "front" and "rear" directions are labeled in FIG. 1 for ease of reference. The vehicle 10 further includes a tailgate 16 configured to move between an open position and a closed position to allow access to the cargo box 14 from the rear of the vehicle 10. Along the sides, the cargo box 14 includes first and second side rails 18, 20. When in the closed position, the tailgate 16 is configured to latch relative to the first and second side rails 18, 20. While a pickup truck is shown in FIG. 1, this disclosure extends to other types of vehicles.

In this disclosure, the vehicle 10 includes at least one box side step, which is a step that can be used by a user to access the cargo box 14 from the side of the vehicle 10. One box side step 22 is visible in FIG. 1. The box side step 22 corresponds to, and in this example is formed in, the second side rail 20. It should be understood that the first side rail 18 may also include a substantially similar box side step. The term box side step refers to the surface where a user places their foot/shoe to access the cargo box 14, namely the bottom wall of a foot well (discussed below), and the corresponding components of the box side step, such as the corresponding support assembly and foot well, which will be discussed below. In this sense, the term box side step refers to an overall box side step assembly.

The box side step 22, in this example, is forward of a rear wheel well 24 of the vehicle 10. The box side step 22 is also rearward of a front panel 26 of the cargo box 14. Providing the box side step 22 in this location increases the ease of mounting the box side step 22 to the cargo box 14 via a support assembly. Further, the box side step 22 may be aligned (i.e., arranged vertically above) at least a rear portion of a running board, which may increase the ease of using the box side step 22.

Figure 2:
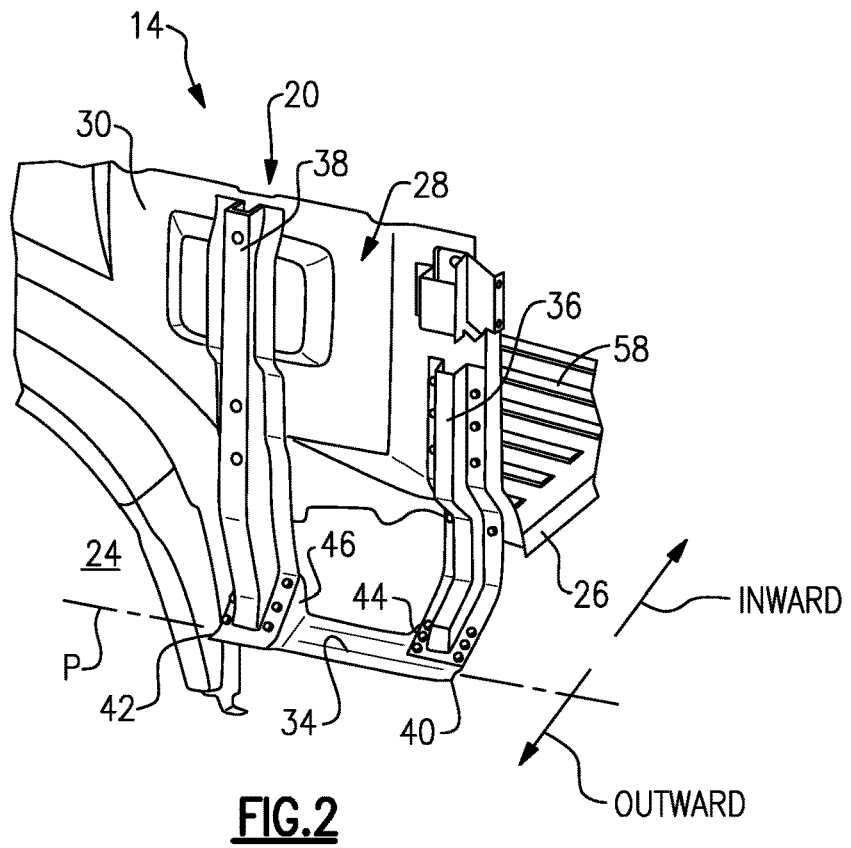
FIG. 2 is a front-perspective view of a portion of a cargo box of the vehicle.
Figure 3:
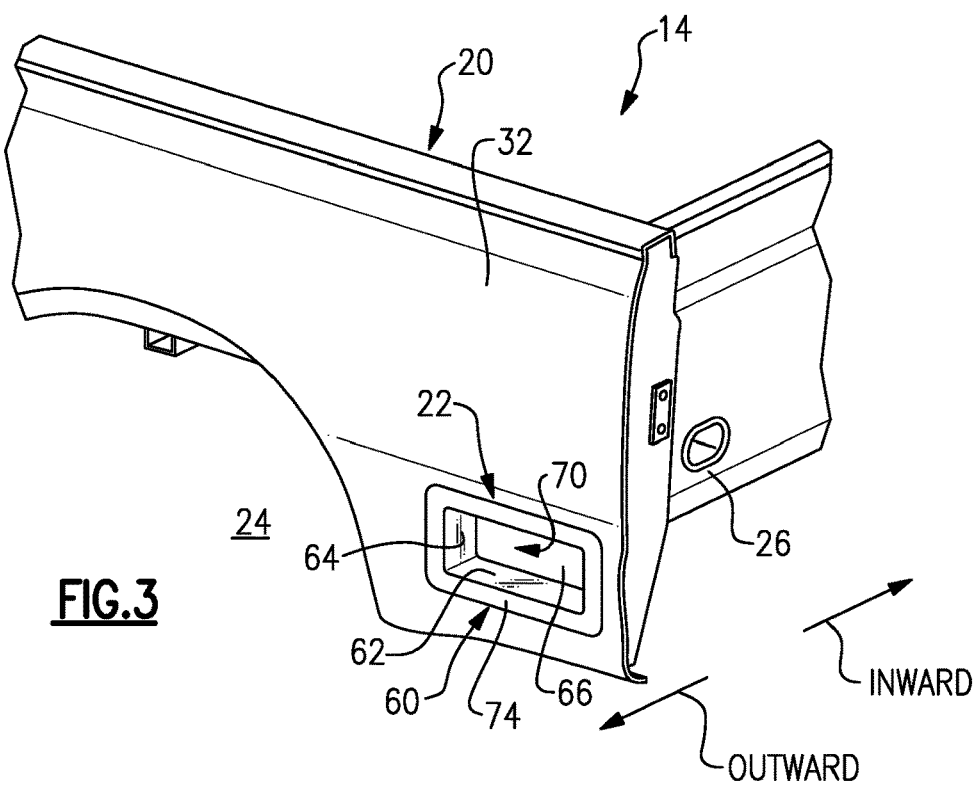
FIG. 3 is a front-perspective view of the portion of the cargo box of FIG. 2 including the outer panel.

FIG. 2 illustrates an example support assembly 28 for the box side step 22. In this disclosure, the first and second side rails 18, 20 include inner and outer panels that are laterally spaced-apart from one another in a direction normal to the centerline C of the vehicle 10. The "inner" and "outer" directions are normal to the centerline C (FIG. 1) and are labeled in some figures for ease of reference. In FIG. 2, the inner panel 30 of the second side rail 20 is shown. The outer panel 32 has been removed in order to illustrate the arrangement of the support assembly 28 relative to the inner panel 30. The outer panel 32 is shown in FIG. 3.

In the example of FIG. 2, the support assembly 28 includes a base 34. The base 34 is a panel which includes a substantially planar upper surface that extends in a plane P. The plane P is substantially parallel to a ground surface. In other words, the plane P is substantially normal to the direction of gravity. In this disclosure, a user places their foot/shoe indirectly on the upper surface of the base 34 when using the box side step 22.

The base 34, in this example, does not project laterally outward beyond the outer panel 32. In a further example, the entirety of the base 34 is arranged laterally between the inner and outer panels 30, 32. Arranging the base 34 in this manner provides a compact design.

A user stepping on the box side step 22 applies a load onto the base 34. That load is transferred to the cargo box 14 via at least one vertical support. In the example of FIG. 2, the support assembly 28 includes first and second vertical supports 36, 38 connecting the base to the inner panel 30. The first and second vertical supports 36, 38 project from the inner panel 30 to a location below the inner panel 30, which is where the first and second vertical supports 36, 38 are connected to the base 34.

The first vertical support 36 is connected to the base 34 adjacent a front end 40 of the base 34, and the second vertical support 38 is connected to the base 34 adjacent a rear end 42 of the base 34, however the first and second vertical supports 36, 38 could be attached to the base at other locations. The base 34, in this example, includes projections 44, 46 projecting upward from the plane P and having angled surfaces contacting a respective one of the first and second vertical supports 36, 38. Projections are not required in all examples.

The first and second vertical supports 36, 38 are substantially U-shaped in cross-section with outwardly-extending flanges on each side. Fasteners, such as bolts or rivets, are used to fasten the first and second vertical supports 36, 38 directly to the inner panel 30. The first and second vertical supports 36, 38 are different lengths, in this example, with the first, front-most vertical support 36 being shorter than the second, rear-most vertical support 38. The lengths of the first and second vertical supports 36, 38 may be the same in other examples. The lengths may be set based on packaging constraints.

Figure 4:
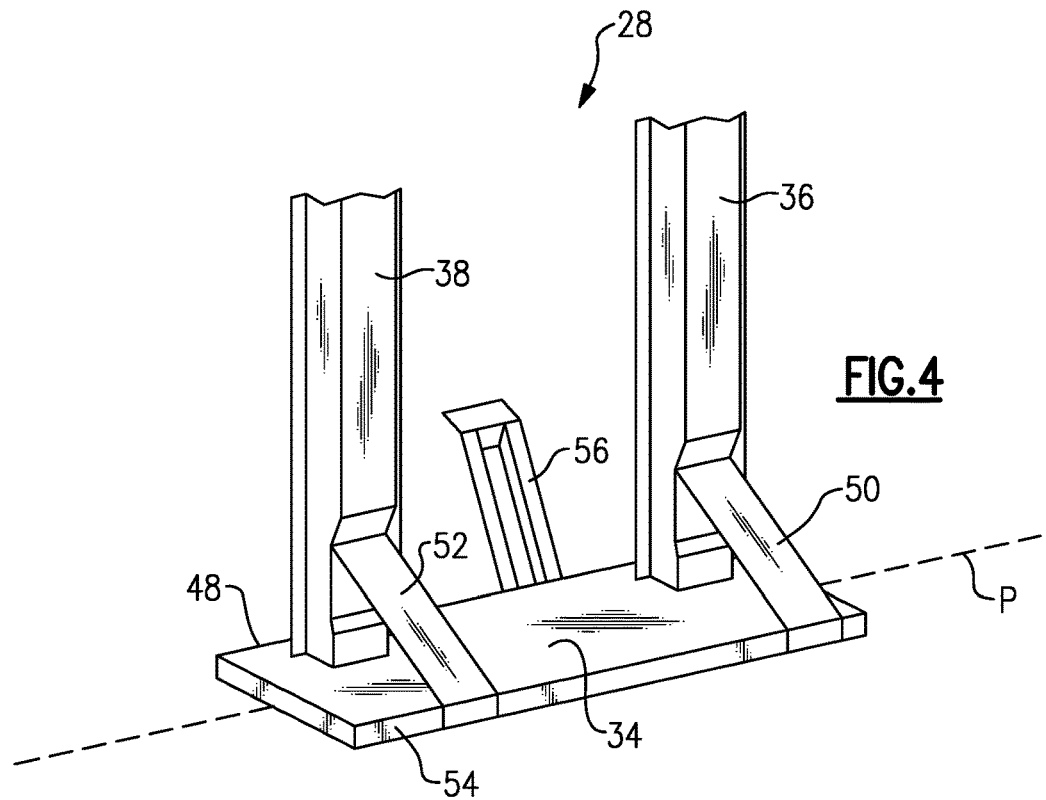
FIG. 4 is a rear-perspective view illustrating additional detail of an example support assembly.

With reference to FIG. 4, the support assembly 28 further includes, in this example, additional reinforcements arranged relative to the base 34 and the first and second vertical supports 36, 38. In particular, in FIG. 4, the first vertical support 36 is connected to the base 34 adjacent an inner edge 48 of the base 34, as is the second vertical support 38. In this case, the support assembly 28 includes first and second reinforcement brackets 50, 52, which extend between a respective one of the first and second vertical supports 36, 38 and an outer edge 54 of the base 34. The first and second vertical supports 36, 38 are non-parallel to the plane P.

The support assembly 28 also includes a third reinforcement bracket 56 connected between the base 34 and a bottom (i.e., an underside) of a bed 58 (FIG. 2) of the cargo box 14. The third reinforcement bracket 56 extends upwardly from the base 34 and inwardly toward the centerline C. The reinforcement brackets 50, 52, 56 provide stability to the base 34 and assist the base 34 in absorbing and transferring loads to the cargo box 14. While in FIGS. 2 and 4 the support assembly 28 includes three reinforcement brackets, the support assembly 28 could include a different arrangement of reinforcement brackets. Further, in some examples there are no reinforcement brackets. One such example is discussed below relative to FIG. 9.

Figure 5:
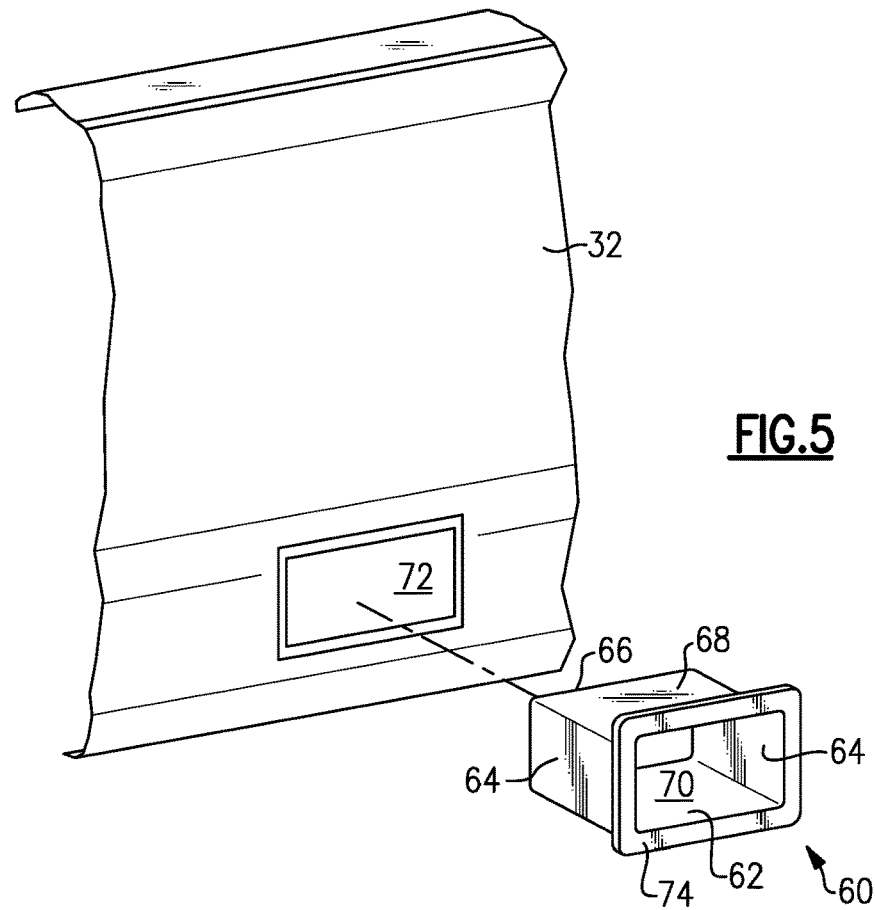
FIG. 5 is an exploded view illustrating an arrangement of an example foot well relative to an outer panel of the cargo box.

With reference to FIGS. 3 and 5, the box side step 22 includes a foot well 60, in this example. The foot well 60 is a structure including a bottom wall 62, opposed side walls 64 extending upwardly from the bottom wall 62, an inner wall 66 extending upwardly from the bottom wall 62 and connecting the side walls 64, and a top wall 68 extending parallel to the bottom wall 62 and connecting the side walls 64 and inner wall 66. The bottom wall 62 directly contacts the base 34, specifically an upper surface of the base 34, in this example. The bottom wall 62 also directly contacts a foot/shoe of a user when the user uses the box side step 22.

The walls 62, 64, 66, 68 are spaced-apart from one another to define an opening 70 configured to receive a foot/shoe of a user. The opening 70 is a blind opening in this example and is open outwardly, facing away from the centerline C, such that a user may insert their foot/shoe into the opening 70. Further, the walls 62, 64, 66, 68 are arranged so as to fit within an opening 72 in the outer panel 32. Opposite the inner wall 66, the walls 62, 64, 66, 68 are connected to a flange 74. The flange 74 has a dimension larger than the opening 72 such that the flange 74 directly abuts an outer surface of the outer panel 32.

Figure 6:
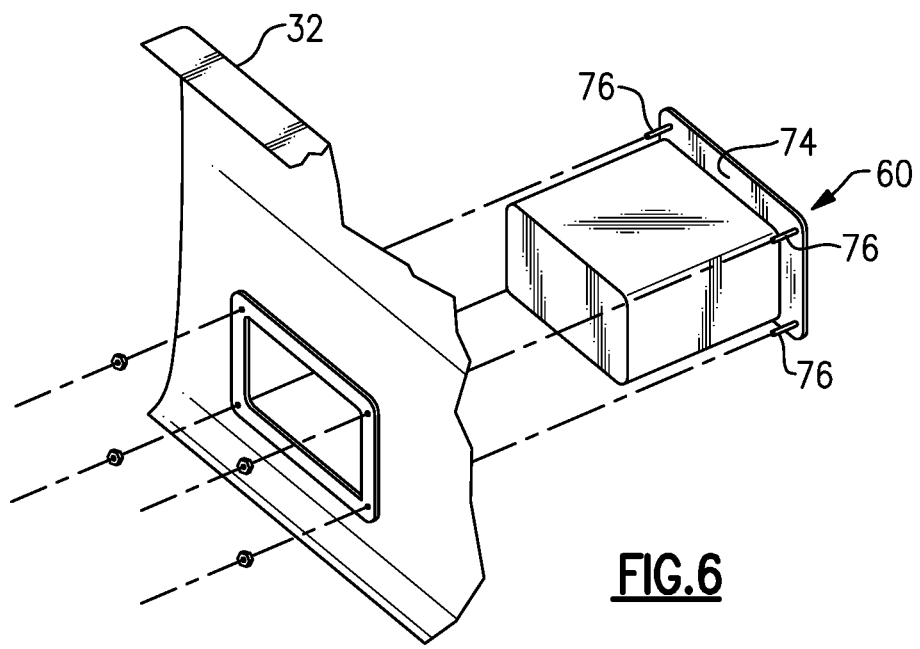
FIG. 6 is another exploded view illustrating an example fastening arrangement of the foot well relative to the outer panel of the cargo box.
Figure 7:
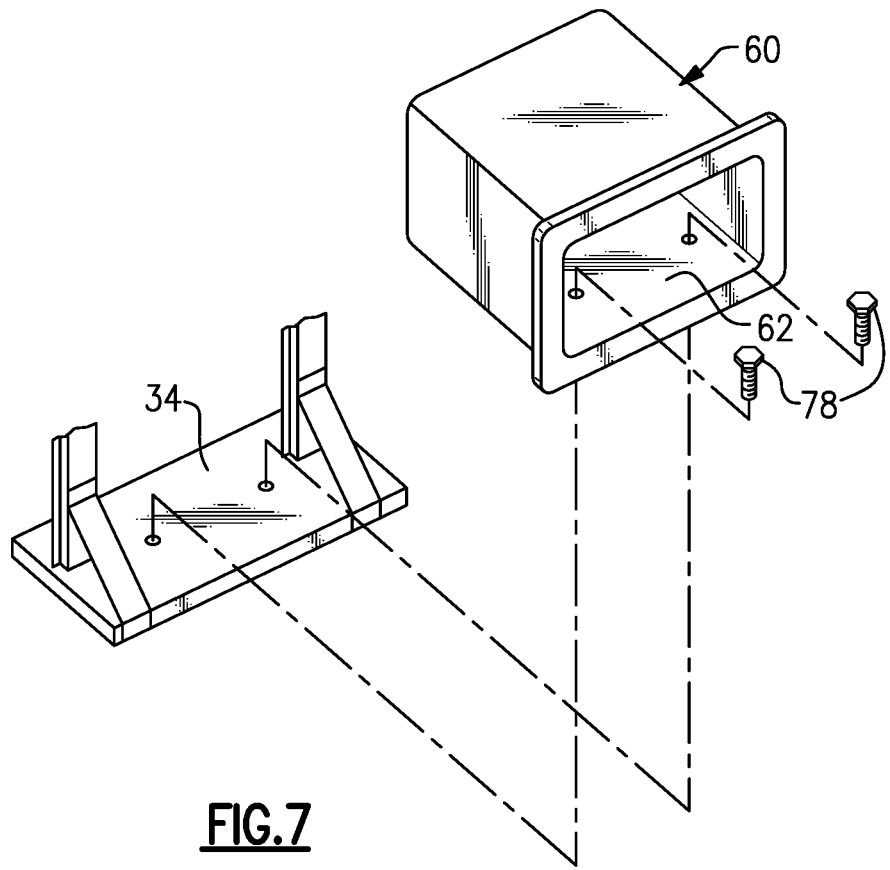
FIG. 7 is an exploded view illustrating an example fastening arrangement of the foot well relative to a base of the support assembly.

The foot well 60 may be fastened to the outer panel 32 via fasteners 76 configured to interface with the flange 74, as shown in FIG. 6. Alternatively or additionally, the foot well 60 may be fastened to the base 34 via fasteners 78 configured to interface with the bottom wall 62, as shown in FIG. 7. The fasteners 76, 78 may be bolts or rivets, as examples.

In one example, the structures of the support assembly 28 are made of a metallic material, such as aluminum (Al). The foot well 60 may be made of a polymer material. The bottom wall 62 may be made at least partially of a material configured to increase friction between the foot well 60 and a shoe/foot of a user, such as a rubber material. The foot well 60 is integrally formed, such as by injection molding, as a single structure without joints or seams, in one example.

Figure 8:
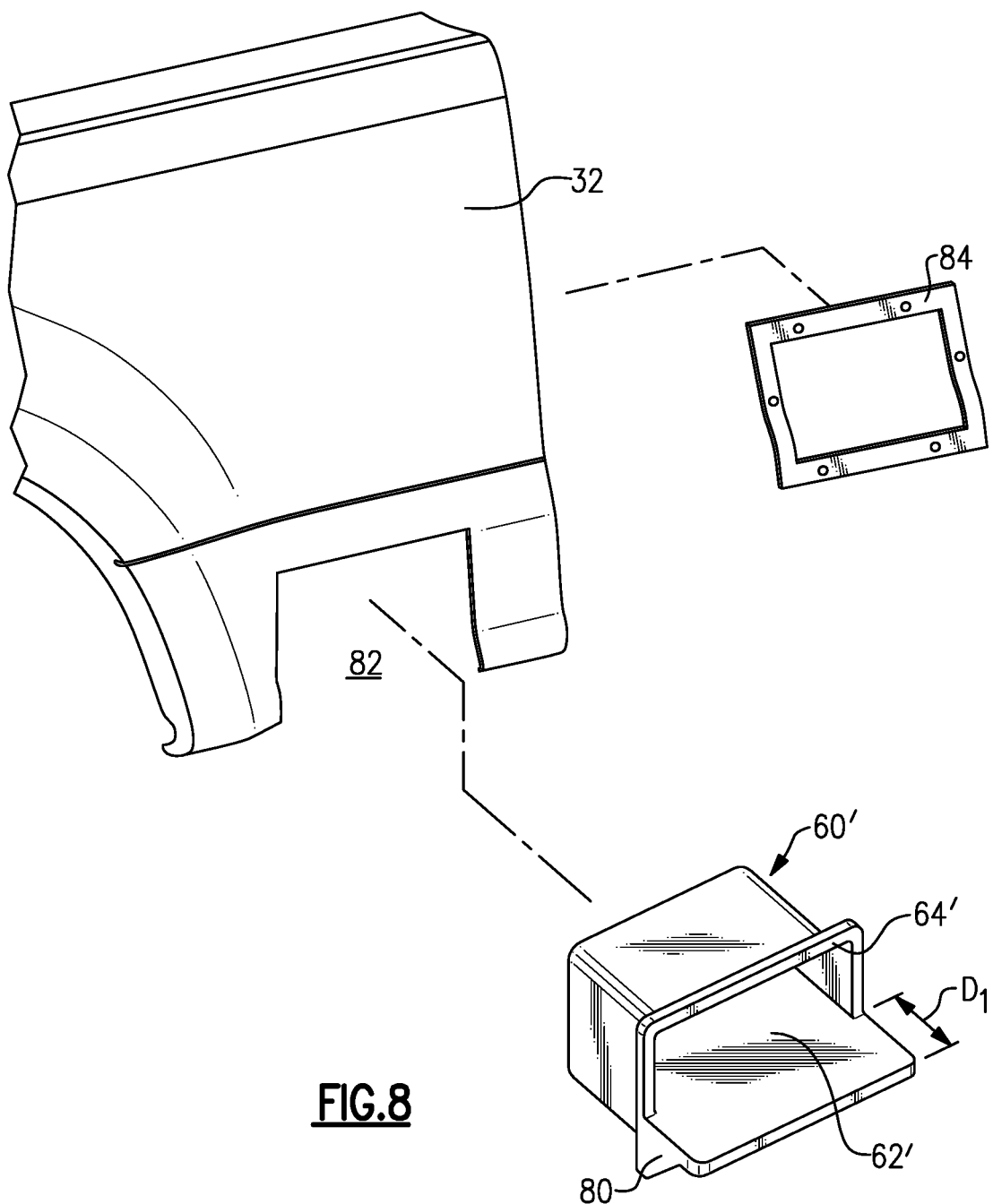
FIG. 8 is an exploded view illustrating another example of a foot well relative to an outer panel of a cargo box.

FIG. 8 illustrates another example arrangement of the outer panel 32 relative to another embodiment of a foot well Like reference numerals are used in FIG. 8 relative to the foot well 60' to indicate similar structures to those described above, with the exception of a trailing apostrophe. In FIG. 8, the foot well 60' is generally arranged as in FIG. 5, with the exception of the bottom wall 62' having an extension 80. The extension 80 projects outward beyond the flange 64', and in turn the outer panel 32, by a distance $D_1$. The distance $D_1$ is about 80 mm (about 3.15 in) in one example. The extension 80 decreases the likelihood that a user's knee or leg interferes with the outer panel 32 during use of the box side step.

Further, with reference to FIG. 8, the foot well 60' is configured to fit relative to a cutout 82 in a lower edge of the outer panel 32, as opposed to an opening, such as the opening 72, which is fully circumscribed by the outer panel 32. As such, an additional reinforcement may be required. An example reinforcement plate 84 configured to fit around the foot well 60' and support the foot well 60' relative to the outer panel 32 is shown. The foot well 60' may alternatively or additionally be fastened to a support assembly similar to the support assembly 28, with the exception that the vertical supports may need to be extended downwardly to accommodate the lower position of the foot well 60' relative to the cutout 82. The foot well 60, which does not include an extension, may also be used relative to an outer panel with a cutout.

Figure 9:
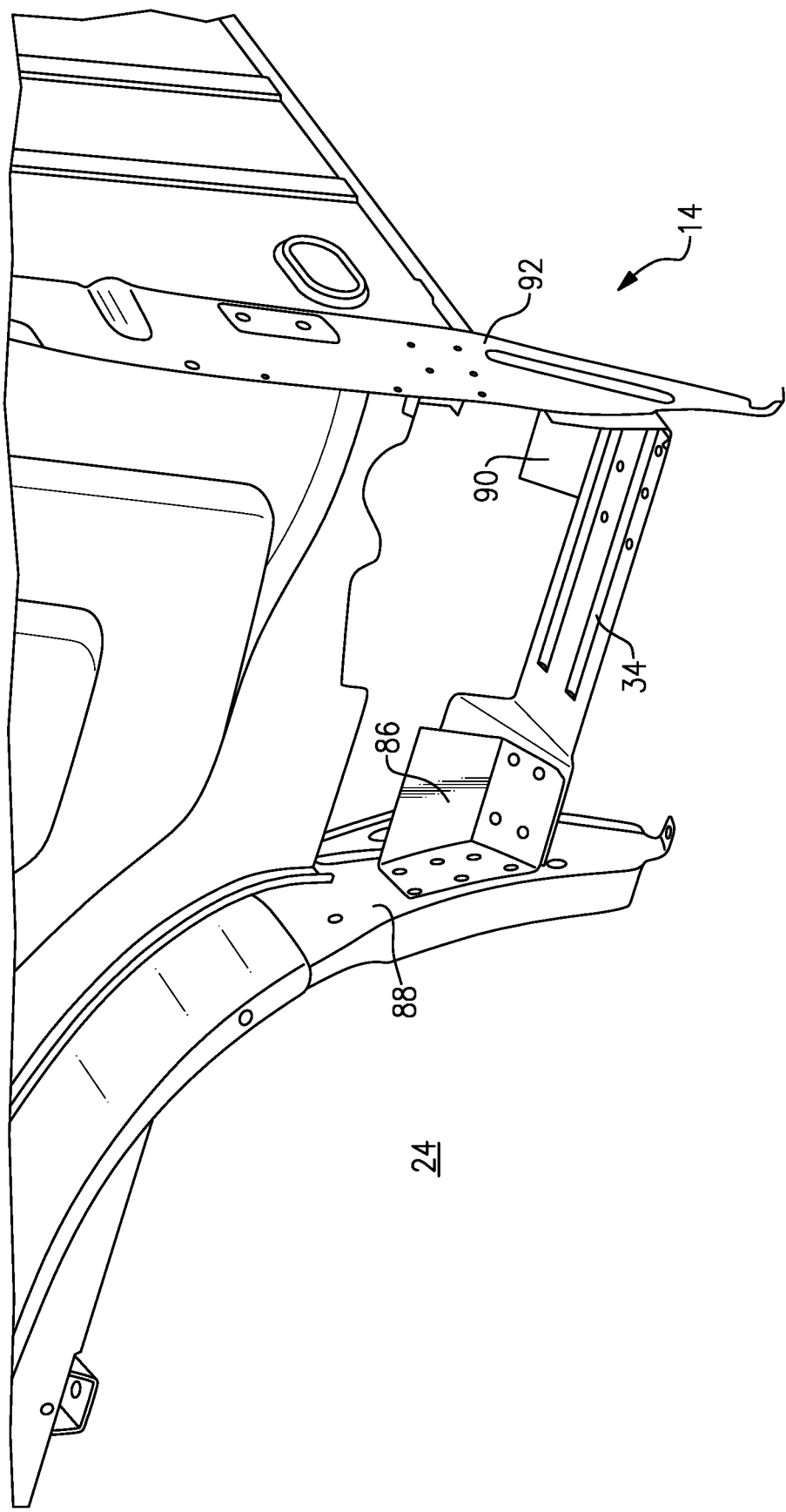
FIG. 9 is a front-perspective view illustrating another example support assembly for a box side step.

An alternate support assembly arrangement is illustrated relative to FIG. 9. In FIG. 9, the base 34 is supported relative to the cargo box 14 via a rear bracket 86 connecting the base 34 to a wheel well housing 88. Specifically, the rear bracket 86 is connected at a point adjacent a rear of the base 34 and is also connected to a front surface of the wheel well housing 88. The wheel well housing 88 is sometimes referred to as a fang. The support assembly further includes a front bracket 90 connecting the base 34 to an extension 92 projecting laterally outward from a front panel 26 the cargo box 14. The extension 92 is sometimes referred to as an elephant ear.

In this example, the rear and front brackets 86, 90 are fastened to an opposite one of an upper surface and a lower surface of the base 34 for stability purposes. The size of the rear and front brackets 86, 90 may be scaled depending on the distance between the wheel well housing 88 and the extension 92, which may vary based on the length of the cargo box 14. The rear and front brackets 86, 90 make use of existing vehicle structures to provide a robust support assembly for a box side step.

Figure 10:
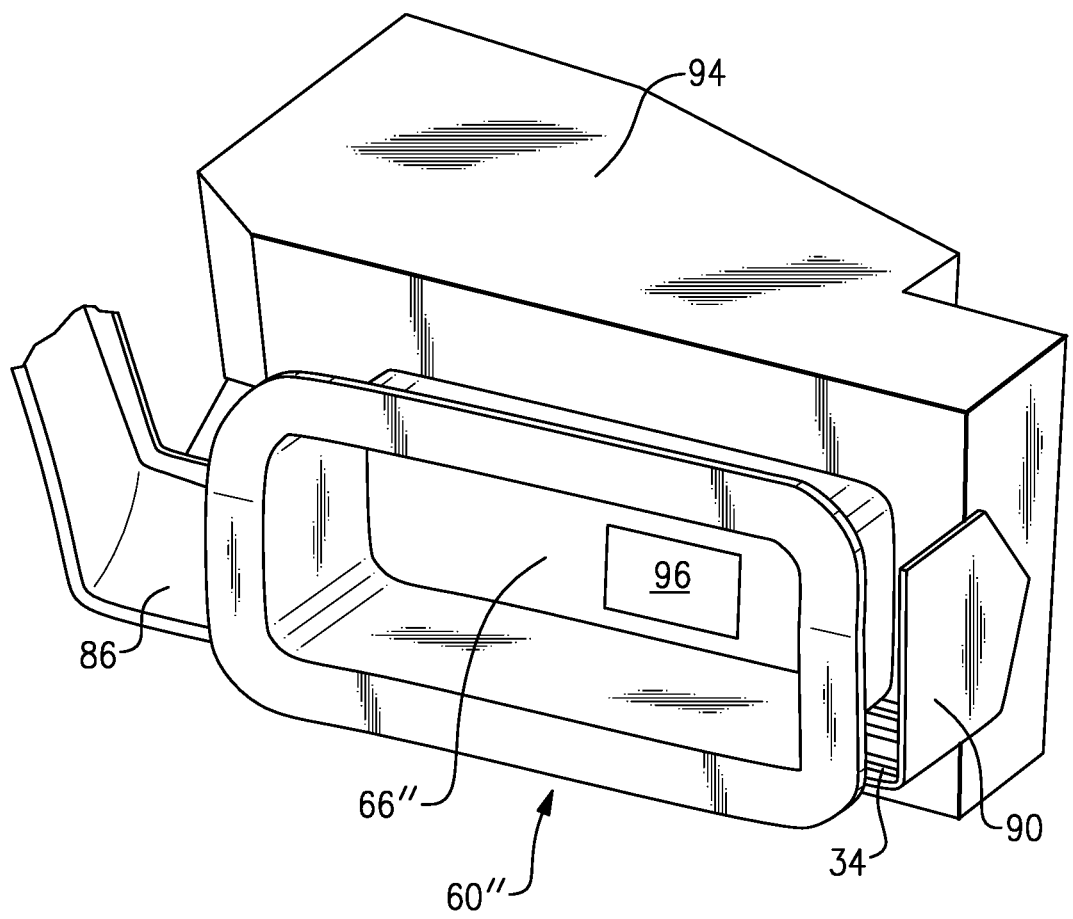
FIG. 10 is a front-perspective view illustrating a box side step relative to an example storage compartment.

The box side steps of this disclosure may, in a further aspect of this disclosure, be used in conjunction with a storage compartment. An example storage compartment 94 is illustrated in FIG. 10 relative to the arrangement of FIG. 9. The storage compartment 94 is a hollow, enclosed compartment mounted inward of the foot well 60" and underneath the bed 58. The foot well 60" is generally similar to the foot well 60, and like reference numerals are used in FIG. 10 to indicate like parts, with two trailing apostrophes.

The storage compartment 94 may be accessed, in this example, via a moveable door 96 of the foot well 60". In this example, the door 96 is arranged in the inner wall 66". In other examples, a door is arranged in other walls of the foot well 60". The inner wall 66", or any other wall of the foot well 60", may be provided entirely the door in other examples. The door 96 may be lockable. The door 96 may pivot or slide, as examples.

It should be understood that terms such as "about," "substantially," and "generally" are not intended to be boundaryless terms, and should be interpreted consistent with the way one skilled in the art would interpret those terms. Further, directional terms such as "top," "bottom," "side," etc., are used for purposes of explanation only and should not otherwise be construed as limiting.

Although the different examples have the specific components shown in the illustrations, embodiments of this disclosure are not limited to those particular combinations. It is possible to use some of the components or features from one of the examples in combination with features or components from another one of the examples. In addition, the various figures accompanying this disclosure are not necessarily to scale, and some features may be exaggerated or minimized to show certain details of a particular component or arrangement.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:
1. A motor vehicle, comprising:
a cargo box including a side wall;
a box side step;
a support assembly for the box side step including a base that does not project beyond an outer panel of the side wall, wherein the box side step includes a foot well,
wherein a bottom wall of the foot well directly contacts the base, and
wherein a portion of the bottom wall of the foot well projects outward beyond the outer panel.

2. The motor vehicle as recited in claim 1, wherein the base lies substantially in a plane parallel to a ground surface.

3. The motor vehicle as recited in claim 1, wherein the portion of the bottom wall projects about 80 mm outward beyond the outer panel.

4. A motor vehicle, comprising:
a cargo box including a side wall;
a box side step;
a support assembly for the box side step including a base that does not project beyond an outer panel of the side wall,
wherein the box side step includes a foot well,
wherein a bottom wall of the foot well directly contacts the base, and
a storage compartment accessible via a moveable door of the foot well.

5. The motor vehicle as recited in claim 1, wherein the foot well is fastened to the base via a plurality of fasteners.

6. The motor vehicle as recited in claim 1, wherein:
the support assembly includes at least one vertical support connecting the base to an inner panel of the side wall.

7. The motor vehicle as recited in claim 6, wherein:
the at least one vertical support includes a first vertical support and a second vertical support,
the first vertical support is connected to the base adjacent a front end of the base, and
the second vertical support is connected to the base adjacent a rear end of the base.

8. The motor vehicle as recited in claim 7, wherein:
the vertical supports are different lengths.

9. The motor vehicle as recited in claim 8, wherein a front-most one of the first and second vertical supports is shorter than the other of the first and second vertical supports.

10. The motor vehicle as recited in claim 7, wherein:
the first vertical support is connected to the base adjacent an inner edge of the base,
the support assembly includes a first reinforcement bracket connected between the first vertical support and a point on the base adjacent an outer edge of the base,
the second vertical support is connected to the base adjacent an inner edge of the base, and
the support assembly includes a second reinforcement bracket connected between the second vertical support and a point on the base adjacent an outer edge of the base.

11. The motor vehicle as recited in claim 10, wherein:
the support assembly includes a third reinforcement bracket connected between the base and a bottom of a bed of the cargo box.

12. The motor vehicle as recited in claim 1, wherein:
the support assembly includes a rear bracket connecting the base to a wheel well housing, and
the support assembly includes a front bracket connecting the base to an extension projecting laterally from the cargo box.

13. The motor vehicle as recited in claim 1, wherein the box side step is forward of a rear wheel well of the motor vehicle.

14. The motor vehicle as recited in claim 13, wherein the box side step is aligned with a portion of a running board of the motor vehicle.

15. The motor vehicle as recited in claim 1, wherein:
the side wall is one of a first side wall and a second side wall of the cargo box,
the box step is a first box step corresponding to the first side wall, and
the motor vehicle includes a second box step corresponding to the second side wall.

16. The motor vehicle as recited in claim 1, wherein the motor vehicle is a pickup truck.

17. A box side step assembly for a motor vehicle, comprising:
a foot well; and
a support assembly including a base, wherein the base supports the foot well on an upper surface thereof, wherein the upper surface lies substantially in a plane parallel to a ground surface, wherein the base is supported at a location forward of a rear wheel housing by a structure connected to one of an inner panel of a cargo box, a rear wheel well housing, and an extension projecting laterally from the cargo box.

18. The box side step assembly as recited in claim 17, wherein:
the structure is a rear bracket connecting the base to the rear wheel well housing, and
the support assembly includes a front bracket connecting the base to the extension.

19. The box side step assembly as recited in claim 17, wherein:
the structure is a first vertical support connected to the base adjacent a front end of the base,
a second vertical support is connected to the base adjacent a rear end of the base, and
the first and second vertical supports connect the base to the inner panel of the cargo box.

* * * * *